2,880,592

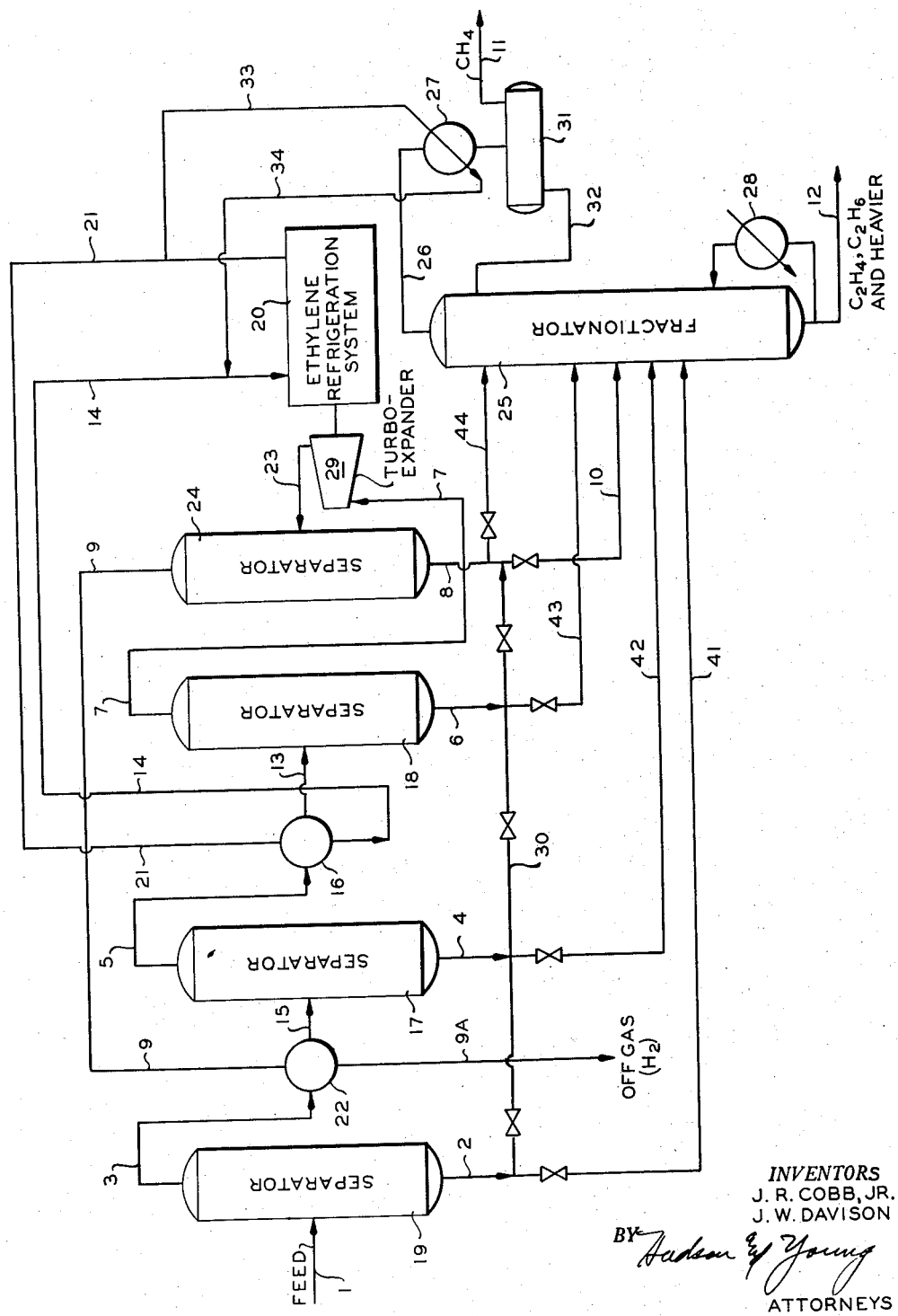

DEMETHANIZATION OF CRACKED GASES

Joseph W. Davison and Joseph R. Cobb, Jr., Bartlesville, Okla., assignors to Phillips Petroleum Company, a corporation of Delaware Application November 10, 1955, Serial No. 546,139

6 Claims. (Cl. 62—25)

This invention relates to demethanization of a gas. In one aspect it relates to a demethanization of a cracked gas containing in addition to $C_2$ and $C_3$ hydrocarbons considerable quantities of hydrogen. In another aspect it relates to a demethanization of a gas produced by the cracking of ethane for the production of ethylene.

An object of this invention is to provide a method and apparatus for the demethanization of gases.

Another object of this invention is to provide a method and apparatus for the demethanization of cracked gases.

Still another object of our invention is to provide a method for the demethanization of a gas containing components boiling higher and at least one component boiling lower than methane.

Still another object of our invention is to devise a method for demethanizing a gas resulting from the cracking of ethane, propane and/or butane, for the production of ethylene.

Still other objects and advantages of our invention will be realized upon reading the following description which, with the attached drawing, forms a part of this specification.

The drawing is a diagrammatic representation of apparatus parts suitable for carrying out the process of our invention.

Our invention resides substantially in the combination, construction, arrangement and relative location of parts, steps and series of steps, involved in a method for demethanizing a gas comprising methane, ethylene, ethane, propylene and hydrogen, comprising chilling said gas to a temperature sufficiently low to condense a major portion of the $C_2$ hydrocarbons in said gas at a superatmospheric pressure, separating condensate from uncondensed gas, expanding the uncondensed gas to produce additional condensate, separating the expanded product into a gas phase rich in hydrogen and a liquid phase, combining said liquid phase with the separated condensate and fractionating the first mentioned condensate and liquid phase to produce an overhead product rich in methane and a kettle product rich in ethylene and ethane.

Referring now to the drawing, reference numerals 17, 18 and 19 identify vapor-liquid separator vessels constructed for separation of fluid phases under superatmospheric pressure. A feed gas, for example, produced in the cracking of ethane for the production of ethylene, after dehydration and deoiling for the removal of propane and higher boiling hydrocarbons, is conducted from a source, not shown, through a pipe 1 into the first separator vessel 19. The separated vapor phase is removed through a pipe 3 and the vapor is conducted through a heat exchanger 22 operating as a cooler from which fluid passes through a pipe 15 into the separator vessel 17. Vapor separated in this vessel is passed through a pipe 5 to a heat exchanger 16 which serves to chill the gas from pipe 5 and chilled gas now containing some condensate is passed on through a pipe 13 into the separator vessel 18.

Such a feed stock produced in the cracking of ethane, propane and/or butane and deoiled for the removal of propane and higher boiling hydrocarbons contains in addition to methane large quantities of ethylene, ethane, hydrogen, along with a small proportion of propylene. This gas for example at a pressure between about 700 and 900 p.s.i.a. (pounds per square inch absolute) is fed into the first separator 19. In the example as given herein, the temperature of this feed gas after its deoiling and dehydration steps is about —25° F. The cooler 22 cools this gas to about —60° F. and chiller 16 chills the gas from pipe 5 to about —120° F. The gas separated in separator 18 has a temperature of approximately —120° F. and this gas is passed through a pipe 7 to the inlet side of a turbo-expander 29 which operates by isentropic expansion with the production of useful work. Expanded fluid from the turbo-expander 29 is passed through a conduit 23 into a liquid gas separator 24.

The turbo-expander 29 can be any suitable and available type of turbo-expander, of which the Kapitza turbine is an example of the form. The expander must be of the type capable of handling fluids containing appreciable liquid content since it is intended that an appreciable amount of liquid be condensed during the expansion step. Suitable forms of Kapitza turbines are disclosed in U.S. Patent 2,280,585 granted April 21, 1942. On undergoing expansion in turbine 29 with the performance of work the fluid is cooled from about the aforementioned —120° F. to a temperature within the approximate range of —230° F. to —170° F. Pressure of the expanded gas has been decreased from the previous high pressure to a pressure within the approximate range of 5 p.s.i.g. to 100 p.s.i.g. (pounds per square inch gauge). When the temperature of the feed gas to the process is —25° F. and its pressure 800 p.s.i.a. the expanded fluid has a temperature of approximately —220° F. under 45 p.s.i.g. In separator vessel 24 the liquid and gas phases are separated and the gas at this very low temperature is passed through a pipe 9 to the cooler 22 for imparting at least a portion of the refrigeration to the gas from pipe 3. Refrigerant gas from cooler 22 passes from the system through a pipe 9A. This gas is essentially hydrogen, separated from the hydrocarbon gases in the aforementioned separation steps.

The turbo-expander 29 is connected mechanically for driving a compressor for compressing for example ethylene of an ethylene refrigeration system 20 for the production of a refrigerant for the final chilling step in chiller 16. This refrigeration system can be any suitable commercial refrigeration system provided it is adapted to produce adequate refrigeration. We prefer, however, to employ ethylene as the refrigerant. The cooled refrigerant from system 20 is passed through a pipe 21 to the chiller 16 from which it returns to the compressor of the refrigeration system through a pipe 14.

It will be obvious that all of the pipes and conduits and vessels in which materials in process are maintained at a subatmospheric temperature will be well insulated against absorption of heat from the atmosphere.

The liquid condensates from separator tanks 19, 17 and 18 are removed through the respective pipes 2, 4, and 6 and are combined in pipe 30. The combined condensates from separators 19, 17 and 18 are combined with the condensate from the turbo-expander separated in separator 24 and removed therefrom via a pipe 8. The total combined condensate is passed on through a pipe 10 into approximately the center vertically of a fractionator vessel 25. This fractionator vessel 25 is constructed to withstand high pressures such as ordinarily utilized in the fractional distillation of methane from $C_2$ hydrocarbons. Overhead vapors from fractionator 25 are removed through a pipe 26 and at least a portion is condensed in condenser 27, the condensate and uncondensed materials being passed into an accumulator 31 from which liquid is passed through pipe 32 into the top of the fractionator for refluxing the column. Uncondensed gas from accumulator 31 is removed as the methane product of the process through a pipe 11 for such disposal as desired. Bottoms product comprising ethylene, ethane and other higher boiling hydrocarbons such as propylene, is removed from the fractionator through a pipe 12 for such disposal as desired. Heat for reboiling the column is provided from a heat exchanger 28. In case the operation is directed to the production of ethylene the bottoms product from pipe 12 will obviously be fed into an ethylene-ethane fractionator which is operated in a manner to distill ethylene as an overhead product with ethane and any other higher boiling components being separated as the kettle product.

We find that ordinarily the turbo-expander 29 is capable of providing at least most of the power for the production of refrigeration for condensing sufficient overhead gas in condenser 27 for the production of reflux for the proper operation of fractionator 25. When the ethylene refrigeration system provides this refrigeration, refrigerant from the system 20 is conducted through pipes 21 and 33 to the condenser 27 and the used refrigerant is transferred through pipes 34 and 14 to the inlet of the compressor of the refrigeration system. With feed gas to the system at a pressure of about 800 pounds per square inch we operate fractionator 25 at a pressure of approximately 400 p.s.i.g. with a reflux temperature of about $-120°$ F. and by employing these conditions, we are able to produce a methane product containing only very minor amounts of higher boiling hydrocarbons.

As an example of the utility of our process the following tabulation gives stream compositions of the important intermediate and product streams of the process. Temperatures and pressures are also given in the tabulation.

of ethylene, which is lost in our fractionator overhead methane product and 208 mols in the off-gas from pipe 9. The savings accomplished by our operation over the conventional fractionation is 2,192 mols of ethylene per 24,043 mols of ethylene in the feed stock. This savings represents over 9 percent. In the material balance of the conventional fraction the fractionator employed contains the same number of trays as the fractionator 25 employed in our process. The same tower pressures also were employed as well as the same $-120°$ F. overhead temperature but for the conventional fractionation there was required 20,000 mols of reflux per 73,000 mols of feed stock in comparison to only 6,600 mols of reflux required to reflux fractionator 25 when processing the same volume of feed stock.

Under some conditions it is desirable to introduce the several condensates and the liquid separated from the expansion step separately and at different levels into the fractionator 25. In this operation liquid from separator 19 is introduced at a point low in the fractionator, and liquids from separators 17, 18 and 24 are introduced at successively higher points in the column. This operation is accomplished by closing the several valves in pipe 30 and the valve in pipe 10, and opening the valves in pipes 41, 42, 43 and 44.

As understood by those skilled in the art, pressure regulators and pumps will need to be installed at strategic locations to reduce pressure, and to increase pressure of fluid contents of pipes and vessels when necessary.

It is also noted that column 25 of our invention is not overloaded with excessive amounts of uncondensable hydrogen as a column would be when operating directly on the feed stock.

Materials of construction may be selected from among those commercially available and adapted for use in

| Stream No. | (1) | (2) | (3) | (4) | (5) | (6) | (7) | (8) | (9) | (10) | (11) | (12) |
|---|---|---|---|---|---|---|---|---|---|---|---|---|
| Mols per Day: | | | | | | | | | | | | |
| $H_2$ | 31,661 | 299 | 31,362 | 526 | 30,836 | 372 | 40,464 | 4 | 30,460 | 1,201 | 1,201 | |
| $CH_4$ | 5,055 | 368 | 4,687 | 950 | 3,737 | 1,165 | 2,572 | 173 | 2,399 | 2,656 | 2,655 | |
| $C_2H_4$ | 24,043 | 4,770 | 19,373 | 9,180 | 10,193 | 8,250 | 1,943 | 1,735 | 208 | 23,835 | 300 | 1 |
| $C_2H_6$ | 12,324 | 3,080 | 9,244 | 5,180 | 4,064 | 3,340 | 724 | 672 | 62 | 12,262 | | 23,535 |
| $C_3H_6$ | 200 | 115 | 85 | 78 | 7 | 7 | | | | 200 | | 12,262 |
| | | | | | | | | | | | | 200 |
| | 73,283 | 8,632 | 64,751 | 15,914 | 48,837 | 13,134 | 35,703 | 2,584 | 33,129 | 40,154 | 4,156 | 35,998 |
| Temp., °F | -25 | -25 | -25 | -60 | -60 | -120 | -120 | -220 | -220 | -82 | [1] -120 | [2] 15 |
| Pressure, p.s.i.a | | 800 | 800 | | | | | | | | | |
| Pressure, p.s.i.g | | | | | | | | | | 45 | | |

[1] Reflux is 6,600 mols per day.
[2] The fractionator (25) is operated with a kettle temperature of 15° F. at about 400 p.s.i.g.

| Stream No. | (15) | (13) | (9A) | (14) |
|---|---|---|---|---|
| Temp., °F | -60 | -120 | -40 | -130 |

For comparison purposes the following tabulation gives a material balance of a fractionating column operating on a feed stock similar to that employed in our process but without the several refrigeration and gas-liquid separation steps and also without the use of the turbo-expander, and employing only fractional distillation.

*Conventional fractionation* [1]

| Mols | Feed | Overhead Product | Kettle Product |
|---|---|---|---|
| $H_2$ | 31,661 | 31,661 | |
| $CH_4$ | 5,055 | 5,054 | 1 |
| $C_2H_4$ | 24,043 | 2,700 | 21,343 |
| $C_2H_6$ | 12,324 | | 12,324 |
| $C_3H_6$ | 200 | | 200 |

[1] This fractionation employed the same number of trays as employed in fractionator 25.

In this comparison it should be noted that the overhead product of the conventional fractionation contains 2,700 mols of ethylene in comparison to only 300 mols high pressure and low temperature applications. Corrosion resistance equipment usually is not needed since such materials as contemplated herein to be treated by our process will have previously been freed of corrosive components and moisture.

While certain embodiments of the invention have been described for illustrative purposes, the invention obviously is not limited thereto.

We claim:

1. A method for demethanizing a gas comprising methane, ethylene, ethane, propylene and hydrogen comprising chilling said gas in successive chilling stages to a temperature of about $-120°$ F. at a final pressure of about 780 p.s.i.a., separating a separate liquid condensate from each of the successive chilling steps from uncondensed gas, expanding said uncondensed gas to a temperature of about $-220°$ F. and at about 45 p.s.i.g. to produce additional condensate, separating the expanded product into a gas phase and a liquid phase, introducing the separate condensates at successive levels in a fractional distillation zone, the condensate produced by the last and lowest temperature chilling stage of said successive chilling stages being introduced into said fractional distillation zone at the highest level of said successive levels, introducing the condensate produced in the expanding operation into said fractionation zone at a still higher level than the highest level of said successive levels, fractionating the so-introduced condensates at a pressure of about 400 p.s.i.g. and with reflux at a temperature of about $-120°$ F. to produce an overhead product rich in methane and a kettle product rich in ethane and ethylene.

2. A method for demethanizing a gas comprising methane, ethylene, ethane, propylene and hydrogen comprising chilling said gas in successive chilling stages to a temperature sufficiently low to condense a major portion of the $C_2$ hydrocarbons in said gas at a superatmospheric pressure, separating a separate liquid condensate from each of the successive chilling steps from uncondensed gas, expanding said uncondensed gas to produce additional condensate, separating the expanded product into a gas phase and a liquid phase, introducing the separate condensates at successive levels in a fractional distillation zone, the condensate produced by the last and lowest temperature chilling stage of said successive chilling stages being introduced into said fractional distillation zone at the highest level of said successive levels, introducing the condensate produced in the expanding operation into said fractionation zone at a still higher level than the highest level of said successive levels, fractionating the so-introduced condensates to produce an overhead product rich in methane and a kettle product rich in ethane and ethylene.

3. In the method of claim 1 operating an ethylene refrigeration system from the power obtained from the expansion step and employing the so obtained refrigeration in the final chilling step of the successive chilling steps.

4. In the method of claim 2 operating an ethylene refrigeration system from the power obtained from the expansion step and employing the so obtained refrigeration in the final chilling step of the successive chilling steps.

5. In the method of claim 1 operating an ethylene refrigeration system from the power obtained from the expansion step, condensing a portion of the overhead product rich in methane by indirect heat exchange with refrigerant ethylene, refluxing the fractionating step with the condensed methane and removing the remainder of the methane from the fractionating step as a product.

6. In the method of claim 2 operating an ethylene refrigeration system from the power obtained from the expansion step, condensing a portion of the overhead product rich in methane by indirect heat exchange with refrigerant ethylene, refluxing the fractionating step with the condensed methane and removing the remainder of the methane from the fractionating step as a product.

References Cited in the file of this patent

UNITED STATES PATENTS

| | | |
|---|---|---|
| 1,939,696 | Hasche | Dec. 19, 1933 |
| 2,134,702 | Brewster | Nov. 1, 1938 |
| 2,224,227 | Keith | Dec. 10, 1940 |
| 2,265,527 | Hill | Dec. 9, 1941 |
| 2,265,558 | Ward | Dec. 9, 1941 |
| 2,274,094 | Rupp | Feb. 24, 1942 |
| 2,500,129 | Laverty | Mar. 7, 1950 |
| 2,529,312 | Rupp | Nov. 7, 1950 |
| 2,535,148 | Martin | Dec. 26, 1950 |
| 2,557,171 | Bodle | June 19, 1951 |
| 2,573,341 | Kniel | Oct. 30, 1951 |
| 2,600,494 | Ferro | June 17, 1952 |
| 2,619,814 | Kniel | Dec. 2, 1952 |
| 2,677,945 | Miller | May 11, 1954 |
| 2,765,635 | Redcay | Oct. 9, 1956 |
| 2,769,321 | Stiles | Nov. 6, 1956 |